United States Patent [19]

Schmid

[11] Patent Number: 5,313,460
[45] Date of Patent: May 17, 1994

[54] MULTIPLEX CIRCUIT ARRANGEMENT, PARTICULARLY FOR THE ACTUATION OF LOAD STATIONS IN MOTOR VEHICLES

[75] Inventor: Johann Schmid, Cham, Fed. Rep. of Germany

[73] Assignee: Robert Bosch GmbH, Stuttgart, Fed. Rep. of Germany

[21] Appl. No.: 839,771
[22] PCT Filed: Oct. 16, 1990
[86] PCT No.: PCT/DE90/00784
  § 371 Date: Apr. 10, 1992
  § 102(e) Date: Apr. 10, 1992
[87] PCT Pub. No.: WO91/06448
  PCT Pub. Date: May 16, 1991

[30] Foreign Application Priority Data

Nov. 6, 1989 [DE] Fed. Rep. of Germany ...... 3936894

[51] Int. Cl.$^5$ .............................. H04L 12/40
[52] U.S. Cl. .................... 370/85.1; 370/94.3
[58] Field of Search ............ 370/94.3, 94.1, 94.2, 370/85.1, 85.13, 85.14, 85.2, 85.1; 340/825.5, 825.51

[56] References Cited

U.S. PATENT DOCUMENTS

| | | |
|---|---|---|
| 3,697,767 | 10/1972 | Fioravanti . |
| 4,001,524 | 1/1977 | Prudhon et al. . |
| 4,127,750 | 11/1978 | Prudhon et al. . |
| 4,594,571 | 6/1986 | Neuhaus et al. . |
| 4,845,708 | 7/1989 | Herrmann, Jr. et al. ......... 370/85.1 |
| 4,897,834 | 1/1990 | Peterson et al. ................. 370/85.1 |
| 4,942,571 | 7/1990 | Möller et al. . |

FOREIGN PATENT DOCUMENTS

| | | |
|---|---|---|
| 3149142 | 6/1983 | Fed. Rep. of Germany . |
| 3730468 | 3/1989 | Fed. Rep. of Germany . |
| 2978336 | 11/1971 | France . |
| 2549617 | 2/1985 | France . |

OTHER PUBLICATIONS

Electron. & Applic. Ind., No. 262, Jan. 15, 1979 P. Breteau: "Transmission analaogique bidirectionnelle", pp. 51–52.
Ingenieurs de l'Automobile, No. 8, Nov. 1984, (Paris, FR) P.-J. Salvay et al.:"Electronique automobile, realites et promesses"–Le multiplexage lucas, pp. 71–78.
Electronic Engineering, vol. 55, No. 675, Mar. 1983, (London, GB) P. E. Phillips et al.: "Bus systems in the car", pp. 134–144.

Primary Examiner—Wellington Chin
Attorney, Agent, or Firm—Spencer, Frank & Schneider

[57] ABSTRACT

In a multiplex circuit arrangement, particularly for actuating load stations in motor vehicles, with the circuit including a bus system, an arrangement secure against malfunctions is realized in that the end of each data line ($L_D$) is provided with a bidirectional bus coupling network (station network SN and distributor network VN) including two oppositely connected analog amplifiers (OP1, OP2), with at least a plurality of central bus coupling networks (distributor networks VN) being combined into a star-shaped central bus distributor arrangement (ZVA).

12 Claims, 3 Drawing Sheets

MULTIPLEX CIRCUIT ARRANGEMENT, PARTICULARLY FOR THE ACTUATION OF LOAD STATIONS IN MOTOR VEHICLES

BACKGROUND OF THE INVENTION

The invention is directed toward a multiplex circuit arrangement, particularly for the actuation of load stations in motor vehicles. More particularly, the invention relates to such a multiplex circuit arrangement wherein each station includes a hardware processor for the rapid serial exchange of data and a driver circuit, with the multiplex circuit arrangement comprising a bus system operating with an active level and a passive level, and with the individual stations being connected via a network structure, e.g. a star structure.

A circuit arrangement of this type is disclosed, for example, in DE 3,730,468.A1. This circuit arrangement has a star-shaped structure, with the actual star point, however, extending practically over the length of the entire vehicle. This results in a significant drawback because damage to the central data line may lead to the total malfunction of the system. The large local expanse of the star point has also been recognized as a problem in this publication. Another drawback of the prior art arrangement is that a large amount of circuitry is required for the individual stations. Each station requires control devices including microprocessors and appropriate software, data converters, data processors and bus transfer members, with the function of these subscriber stations ultimately being only to realize decoupling of the individual interface units.

DE 3,149,142.A1 discloses a circuit arrangement having a relatively complicated central station that is equipped with two computers. This circuit arrangement operates according to the master-slave principle, which is also its primary drawback. Modern arrangements do not operate with a central electronic unit, but with equivalent interconnected groups (multi-master principle). Moreover, in this prior art each sub-group is star-shaped and is approached over a separate line which is a drawback since in the automobile art it must be assumed that a plurality of sub-groups will exist, for example, for the four doors, the four corners of the vehicle, the air-conditioning system, the seat adjustment, the sunroof, at various locations in the engine compartment, at the center console, etc. According to the prior art system, no two such sub-groups must be connected to the same data line if their mutual decoupling is to be ensured. If data must be exchanged between two sub-groups, this can be effected only by way of an intermediate stop in the central unit, for example, for the transmission of operator actuated keys in the region of the rear seats in order to operate a door window.

Based on this, it is the object of the invention to configure a circuit arrangement of the above-mentioned type in such a way that the load lines are distributed in a favorable manner and can be secured by way of a central fuse box, with the central region being locally limited if the circuit is realized in a star structure. Moreover, it should be possible to provide coupling to any existing data line by way of a network without incurring decoupling losses. Each station should be able to communicate with every other station without switching processes and without data transfer by way of a microprocessor, with the data of highest priority being transmitted in each case. Finally, it should also be possible to add further subscriber stations to the network without affecting the remaining system, with addresses being assigned to each individual station.

SUMMARY OF THE INVENTION

The above objects are generally accomplished according to the invention by a multiple circuit arrangement particularly for the actuation of load stations in motor vehicles, with each station including a hardware processor for the rapid serial exchange of data and a driver circuit, wherein the multiplex circuit arrangement comprises a bus system operating with an active level and a passive level, with the individual stations being connected by way of a network structure, e.g. a star structure, with each end of each data line being provided with a bidirectional bus coupling network (i.e. a station network and a distributor network, respectively) comprising two oppositely connected analog amplifiers, and with at least a plurality of central bus coupling networks (i.e. the distributor networks) being combined into a central bus distributor arrangement, preferably having a star shape.

Accordingly, the intended solution makes it possible that, if a data line is short-circuited to ground or to the positive pole and if a driver station is malfunctioning, the entire system will not become unable to function since each branch of the net is decoupled. The passive state of the network may be the low level, with a high level applied at one location being transmitted to all other stations. Due to the fact that each data line is terminated at its end, the radiation behavior is minimized. The entire system exhibits lowpass behavior with a variable cutoff frequency and is thus able to counteract the irradiation of high frequencies.

The central bus distributor arrangement provided according to the invention makes it possible to greatly locally limit this central region in a star configuration and thus to considerably reduce its susceptibility to damages and thus to malfunctions of the entire system.

According to the invention, a free-running, bidirectional distributor station may also be constructed without requiring a central logic control unit for reception or transmission, respectively, while in conventional digital bus drivers a switch must always be made between receive and transmit.

Each data line can be matched at both its ends with respect to its resistance. A desired, line specific resistance can here be set which has an advantageous effect on the radiation behavior. The transmitting amplifiers may be constructed to have a defined output resistance.

The above shows that a circuit arrangement according to the invention is particularly suitable for a star structure. In principle and while maintaining the basic advantages, a ring- or T-shaped network can also be constructed.

As a further feature of the invention, respective load fuses are provided for the respective load lines in the central distribution arrangement in the case of a star structure for the central distributor arrangement. This permits the accommodation of the meltable fuses in a central fuse box without significant additional expenditures for lines.

The configuration of the lines to the individual loads as asymmetrical two-wire lines according to a further feature considers the fact that the data line need have only a considerably smaller cross section than the load line.

According to a further feature, at least one sub-distributor arrangement including a plurality of distributer networks is provided for the data-load distribution. Such a sub-distributor arrangement may be provided at a distance of up to 30 m and takes over, for example, the data-load distribution in the rear of a motor vehicle.

According to still further features of the invention, advantageous circuitry configurations, which will be described below together with the description of an embodiment, are provided.

BRIEF DESCRIPTION OF THE DRAWINGS

The invention will be described below in greater detail with reference to an embodiment thereof and in connection with the drawing figures wherein:

FIG. 3 is a sectional view of a cable employed in the circuit arrangement of FIG. 1.

DETAILED DESCRIPTION OF THE PREFERRED EMBODIMENT

A multiplex circuit arrangement according to the invention includes a plurality of load stations VS1 to VS8, each including a hardware processor for the rapid serial exchange of data, with the stations being connected by way of lines L1 to L6 with a central bus distributor arrangement ZVA. Such a hardware microprocessor (CAN) is described, for example, in the periodical "Elektronik-Informationen" [Electronic Informations], No. 3, 1988, pages 46 et seq.

Bus coupling networks are provided at each end of lines L1 to L8, namely station networks SN1 to SN8 on the sides of load stations VS1 to VS8, and distributor networks VN1 to VN9 on the side of the central distributor arrangement ZVA. The station networks SN and the distributor networks VN, which are employed as bus coupling networks, have an analogous structure. Distributor networks VN7 to VN9 are combined as a sub-distributor arrangement UVA which is able to take care, for example, of the signal-load distribution in the rear of a motor vehicle.

Figure 1:
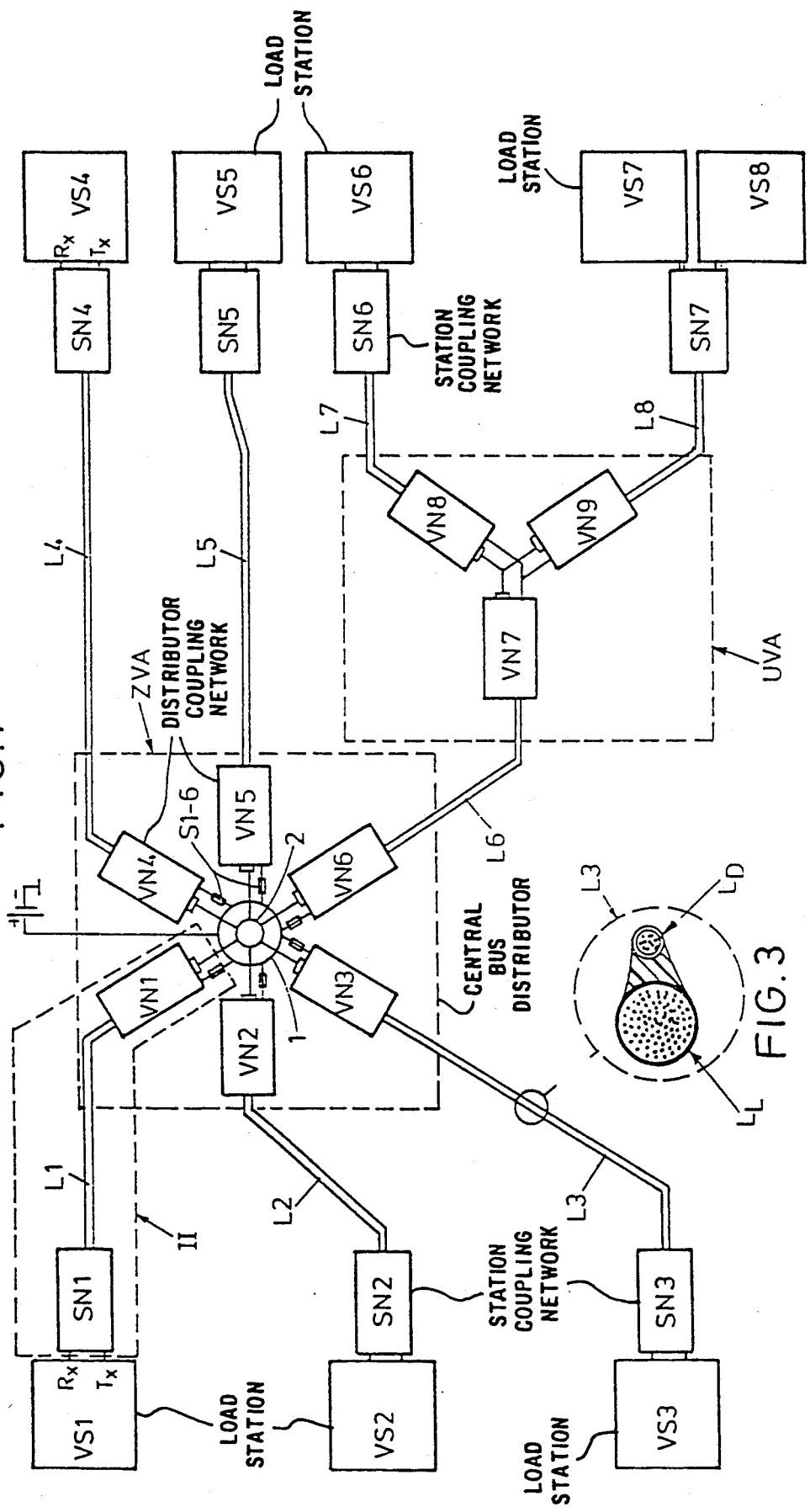
FIG. 1 is a basic circuit diagram for a circuit arrangement according to the invention.

The embodiment according to FIG. 1 has a star-shaped network structure in which the neutral point including distributor networks VN1 to VN6 can be disposed in a small spatial region, for example, on a plate. Before they open into the star point, load lines $L_L$ are secured with ring lines 1 and 2 by way of meltable fuses S1 to S6 that are accommodated in a central fuse box 4.

Each one of lines L1 to L8 is configured as a double wire cable, shown in FIG. 3 in a sectional view, including a load line $L_L$ which has a larger cross section and a data line $L_D$ which has a smaller cross section.

Figure 2:
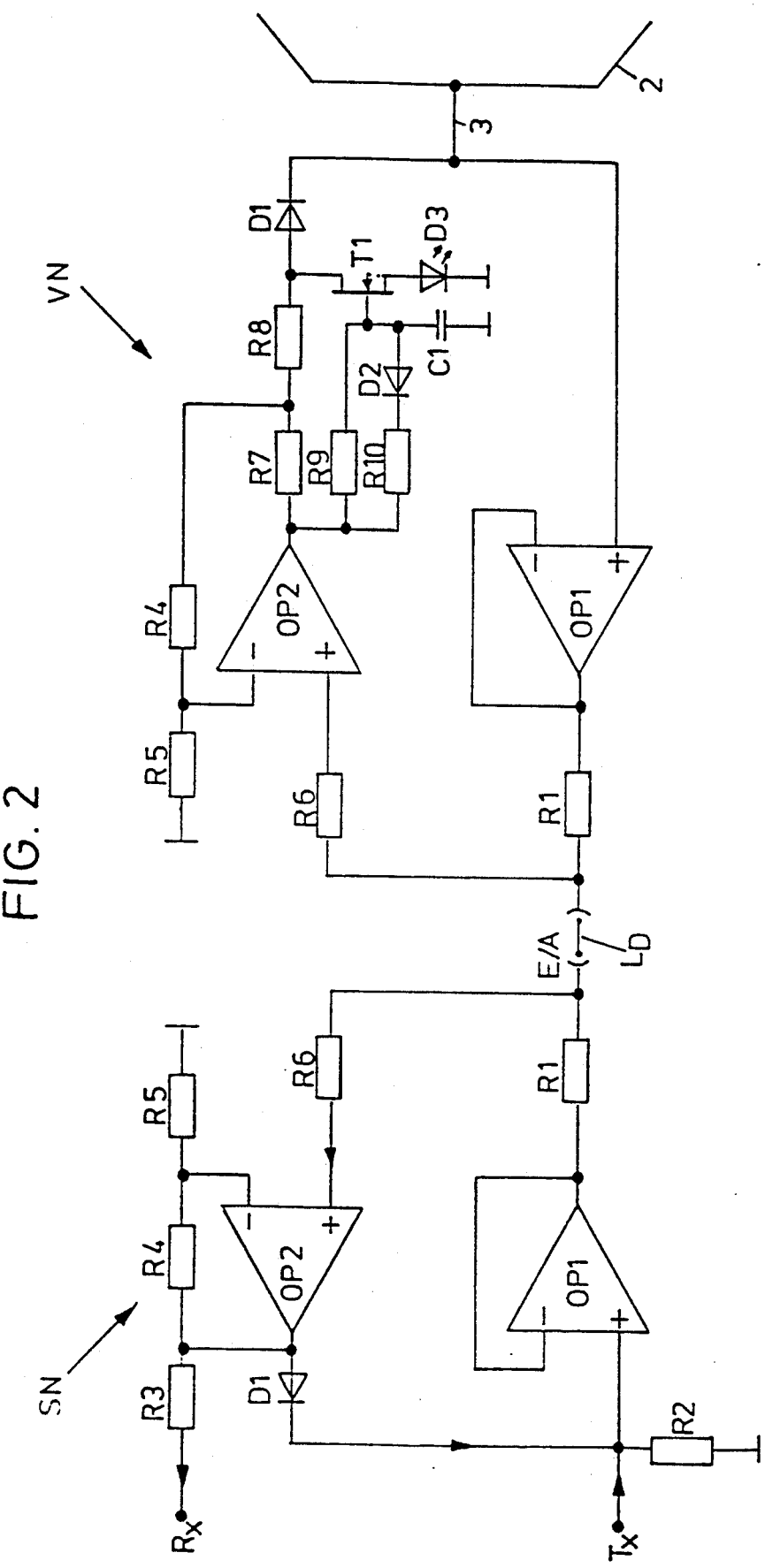
FIG. 2 is a sectional view marked II in FIG. 1 of a data line with bus coupling networks disposed at both ends.
Figure 4:
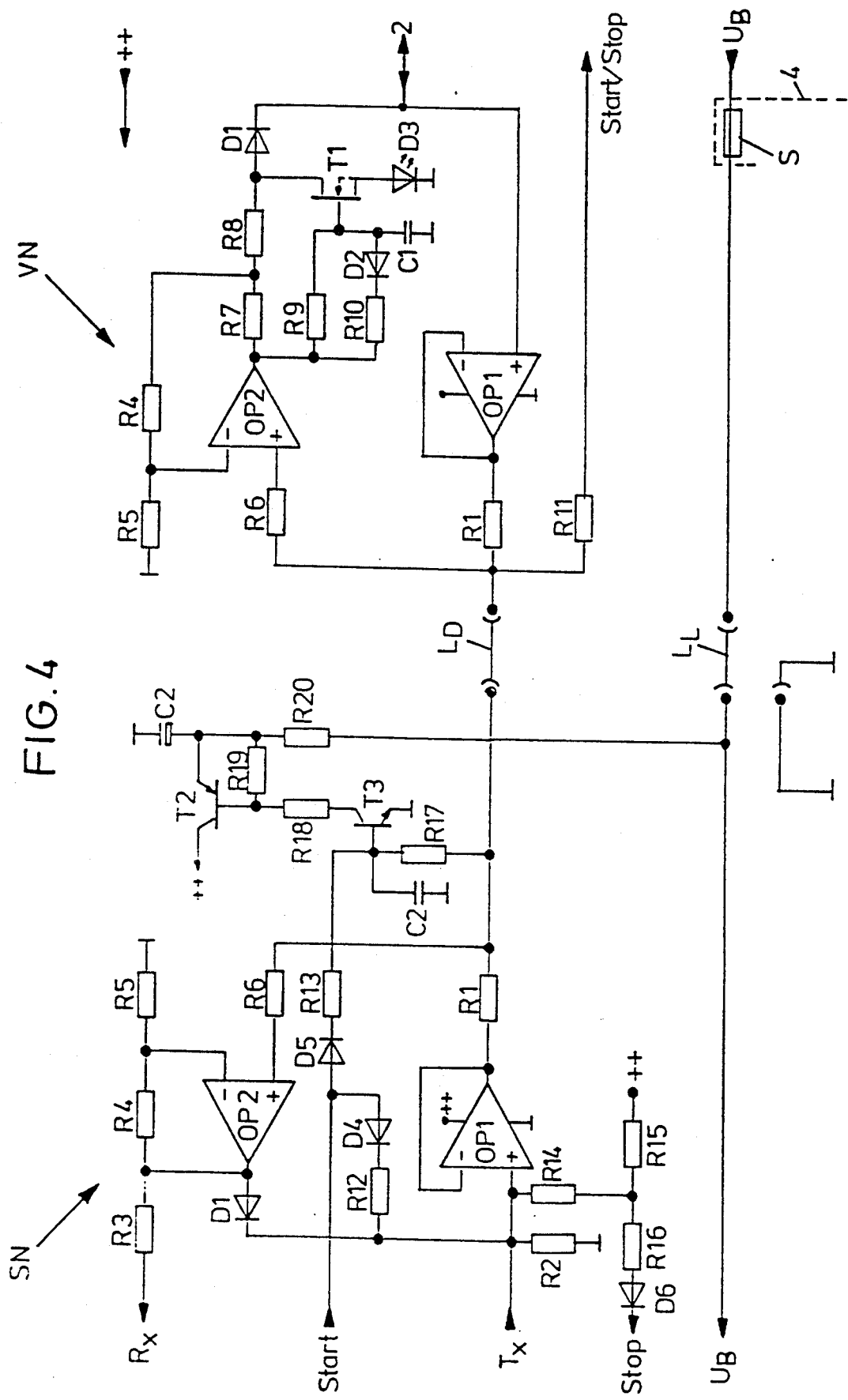
FIG. 4 is a detailed illustration of the circuit portion shown in FIG. 2.

Each one of the station networks SN and distributor networks VN shown individually in FIGS. 2 and 4 includes two oppositely connected analog amplifiers OP1 and OP2, respectively. The output of analog amplifier OP1 is connected to an output resistor R1 whose other side is connected by way of a resistor R6 with the (+) input of analog amplifier OP2. The (−) input of analog amplifier OP2 is grounded by way of a resistor R5 and is connected with the output of analog amplifier OP2 by way of a resistor R4 and with the output $R_x$ of load station VS by way of a further resistor R3.

The (−) input of analog amplifier OP1 is connected directly with the output. The (+) input is connected with ground by way of a resistor R2, and with the output of analog amplifier OP2 by way of a diode D1 that is connected in the blocking, and with the input $T_x$ of load station VS.

Beyond the otherwise identical configuration, except for the connection with the load station, it is provided for the distributor networks VN that two series connected resistors R7 and R8 are provided at the output end of analog amplifier OP2, between its output and diode D1, with the line to the (−) input of analog amplifier OP2 being connected between these two resistors by way of resistor R4. A transistor T1 is provided and has its collector-emitter path connected at one end between resistor R8 and diode D1, and is connected at its other end to ground via a light emitting diode D3. The base of the transistor T1 is connected with the output of analog amplifier 2 by way of resistor R9, on the one hand, and by way of resistor R10 and diode D2, on the other hand, and is connected with ground by way of a capacitor C1. The connection with the data ring line 2 of the star point is effected by way of a line 3 which is connected between diode D1 and the (+) input of amplifier OP1 of network VN. Data line $L_D$ is connected at the free ends of resistors R1 and R6, respectively. Resistors R7 to R10 and capacitor C1 form an RC member which fixes the switching point of transistor T1.

The circuit arrangement according to the invention operates as follows:

In the rest state, an E/A low signal corresponding to the passive level is present at all inputs and outputs $T_x$ and $R_x$.

The loop gain of the circuit $T_x$-OP1-R1-R6-OP2-D1 network SN is less than 1. The transmit output $T_x$ of load station VS and of the hardware processor provided there includes an open drain circuit (open collector).

Diode D1 takes care of the so-called "wired-OR structure" of the network, that is, only the high level (dominant bit) is actively coupled in. The gain factor of analog amplifier OP2 counteracts excessive damping by diode D1 so that a loop gain of slightly less than 1 can be set which is necessary.

The transmit process takes place as follows:

By way of the open drain output $T_x$ a high level of 5 V is applied with low impedance. From the output of analog amplifier OP1 (impedance converter) the signal travels through matching resistor R1 to data line $L_D$ and simultaneously through analog amplifier OP2 back to receiver input Rx. If output $T_x$ sends a low signal, that is, the resistance of $T_x$ becomes high, the voltage in the network also collapses (loop gain<1).

The receive process takes place as follows:

Based on the reversal of the above-described transmit process it is assumed that a HIGH signal from data line $L_D$ travels through E/A to the load station network SN. At this moment, analog amplifier OP1 still carries a LOW signal, that is, the signal voltage drops across R1. This voltage is returned by way of analog amplifier OP2 to the input of analog amplifier OP1. Its output is controlled upwards which leads to a further rise in the signal voltage at the input of the receiver, that is, of analog amplifier OP2. Input and output amplifiers OP2 and OP1, respectively, thus push each other up as soon as a rising signal is present in the data line. The rise rate of the signals is defined by the "slew rate" of analog amplifiers OP1 and OP2, respectively. If the signal drops again, the voltage in network SN also collapses (loops gain < 1). In addition to the loop gain, the dynamic of the descending edge also depends on the RC characteristic of the network which can be influenced by resistor R2.

Due to the analog structure, each distributor network VN operates correspondingly That is, starting from output Tx and by way of analog amplifier OP1, the signal travels to distributor network VN which operates as a receiver and couples the signal into line 2 in the core region of the star structure. All other distributor networks VN of the central distributor arrangement ZVA then operate as transmitters and conduct the signal to the remaining load stations VS. There the respective station networks SN again act as receivers.

To match data lines $L_D$, a low-resistance impedance converter Ra of less than 10 Ohm is provided at both sides of data line $L_D$; together with resistor R1 it takes care of precise matching.

With respect to decoupling of the bus system, a distinction must be made between two possible types of faults.

Short-circuits to ground are not critical with respect to the basic structure and basic operation of the system. Diode D1 in distributor network VN blocks each ground signal from the associated branch line L from entering the remaining bus system.

The circuit portion formed of resistors R7 to R10, capacitor C1, diode D2, transistor T1 and diode D1 is provided in distributor networks VN with respect to possible short circuits toward plus.

This circuit portion operates in such a way that a steady HIGH signal at the anode of diode D1, generated by a short circuit in data line $L_D$ toward plus, by a defective analog amplifier or by a destroyed hardware processor (CAN) would actually put the bus system out of action. This is now counteracted by transistor T1 with the aid of an integrator including resistor R9 and capacitor C1. Corresponding to the integrator time constant, transistor T1 becomes conductive and thus shorts the static HIGH signal to ground. Decoupled by diode D1, the remaining bus system is able to continue working without interruption. The combination of resistor R10 with diode D2 takes care of rapid connection of the branch if such a fault occurs only briefly. In such a case of malfunction, resistors R7 and R8 protect analog amplifier OP2 against overloads and counteract a tendency to oscillate.

The above described circuit arrangement is preferably operated in such a manner that a start-stop mode is provided, that is, the bus system is to be switched off in the parked state and started again as soon as any vehicle function is actuated.

FIG. 4 shows an expanded version of the circuit arrangement described in detail above in connection with FIG. 2.

With the aid of a voltage divider formed by resistors R2, R14 and R15, the voltage level for the LOW signal is raised to 1.5 V. This voltage is monitored by transistor T3 via resistor R17. Transistor T2 is switched to transmit by transistor T3 and thus the network is supplied with current.

If the bus system is to be turned off, all load stations VS must simultaneously apply a STOP signal. The potential for the LOW signal is then pulled to ground by way of resistor R16, transistors T2 and T3 block the current supply and thus disconnect the network.

An analogous process takes place in all other load stations VS so that the supply voltage of the central distributor arrangement ZVA is likewise shut off by way of resistors R11. The entire bus system is thus without voltage, that is, removal of the STOP signal has no effect.

Each load station VS is able to reawaken the entire bus system by means of a START instruction. To do this, the own network is initially switched on by way of diode D5 and resistor R13 and practically simultaneously a HIGH signal is put out by way of diode D4 and resistor R12. By way of resistor R11, this signal starts the current supply for the central distributor arrangement ZVA, is then forwarded to all other load stations VS and, by way of resistor R17, starts all stations.

I claim:

1. A multiplex circuit arrangement, particularly for the actuation of load stations in motor vehicles, with each station including a hardware processor for the rapid serial exchange of data and a driver circuit, the multiplex circuit arrangement comprising a bus system operating with an active voltage level and a passive voltage level and with the individual load stations being connected together by a network structure of line sections each including a data line and a load line, and wherein: each end of each said data line is provided with a respective bidirectional bus coupling network, including a bus coupling station network at a respective said end of a data line connected to a station and a distributor network at the other said end of a respective said data line; each said coupling network comprises a first analog amplifier and a second analog amplifier which is oppositely connected with said first analog amplifier; and at least a plurality of central ones of said bus coupling distributor networks are combined into a central bus distributor arrangement.

2. A multiplex circuit arrangement according to claim 1, wherein the line sections to the individual load stations are configured as asymmetrical, two-wire lines.

3. A multiplex circuit arrangement according to claim 1, wherein at least one sub-distributor arrangement, including a further plurality of said bus coupling distributor networks connected in a star-configuration, is connected between one of said at least a plurality of central ones of said bus coupling distributor networks and the bus coupling station network of each of a plurality of stations to provide for the data-load distribution.

4. A multiplex circuit arrangement according to claim 1, wherein each said first analog amplifier, which acts as impedance converter, has an input which is connected to a signal input of the respective said coupling network and an output which is connected via a matching resistor to the associated respective said data line.

5. A multiplex circuit arrangement according to claim 1, wherein, as a protective measure against short circuits to ground, an output of the said second analog amplifier of a respective said coupling network is connected via a first diode to a signal input of said first analog amplifier of said respective said coupling network.

6. A multiplex circuit arrangement according to claim 5, wherein each said bus coupling distributor network is provided with a protective circuit against short circuits to a positive level including a transistor having a controlled current path connected in series with a second diode between said output of the respective said second analog amplifier and ground, and an RC integrator circuit having an input connected to the output of said respective said second analog amplifier and an output connected to a control input of said transistor, whereby the transistor short circuits a static HIGH voltage level signal to ground as a function of the time constant of the integrator.

7. A multiplex circuit arrangement according to claim 6, further comprising a series connection of a resistor and a third diode connected in parallel with the resistor of said RC integrator circuit.

8. A multiplex circuit arrangement according to claim 1 wherein said plurality of central ones of said bus coupling distributor networks are combined into a star-shaped central bus distributor arrangement.

9. A multiplex circuit arrangement according to claim 8, wherein each said first analog amplifier, which acts as impedance converter, has an input which is connected to a signal input of the respective said coupling network and an output which is connected via a matching resistor to the respective said data line.

10. A multiplex circuit arrangement according to claim 9, wherein, as a protective measure against short circuits to ground, an output of the respective said second analog amplifier is connected via a first diode to said signal line of the respective said coupling network.

11. A multiplex circuit arrangement according to claim 10, wherein each said distributor network is provided with a further protective circuit against short circuits to a positive level including a transistor having a controlled current path connected in series with a second diode between said output of the respective said second analog amplifier and ground, and an RC integrator circuit having an input connected to the output of said respective said second analog amplifier and an output connected to a control input of said transistor, whereby the transistor short circuits a static HIGH voltage level signal to ground as a function of the time constant of the integrator circuit.

12. A multiplex circuit arrangement according to claim 8, wherein load fuses for the load lines of the respective line sections connected at said central bus distributor arrangement are provided in said central distributor arrangement.

* * * * *